(12) United States Patent
Kurabayashi (10) Patent No.: US 10,038,553 B2
(45) Date of Patent: Jul. 31, 2018

(54) INFORMATION RENDERING SCHEME

(71) Applicant: Empire Technology Development LLC, Wilmington, DE (US)

(72) Inventor: Shuichi Kurabayashi, Fujisawa (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 62 days.

(21) Appl. No.: 14/784,111

(22) PCT Filed: Dec. 30, 2013

(86) PCT No.: PCT/US2013/078254
§ 371 (c)(1),
(2) Date: Oct. 13, 2015

(87) PCT Pub. No.: WO2015/102564
PCT Pub. Date: Jul. 9, 2015

(65) Prior Publication Data
US 2016/0056958 A1   Feb. 25, 2016

(51) Int. Cl.
| | | |
|---|---|---|
| *H04L 9/08* | (2006.01) | |
| *H04N 5/913* | (2006.01) | |
| *G06T 1/20* | (2006.01) | |
| *G09G 5/39* | (2006.01) | |
| *G06F 21/82* | (2013.01) | |

(Continued)

(52) U.S. Cl.
CPC ............ *H04L 9/0838* (2013.01); *G06F 21/82* (2013.01); *G06F 21/84* (2013.01); *G06T 1/20* (2013.01); *G09G 5/39* (2013.01); *H04N 5/913* (2013.01); *G09G 2360/126* (2013.01); *G11B 20/00086* (2013.01); *H04L 9/08* (2013.01); *H04L 2209/24* (2013.01); *H04N 1/44* (2013.01); *H04N 1/4486* (2013.01); *H04N 2005/91364* (2013.01)

(58) Field of Classification Search
CPC . H04L 9/08; H04L 9/0838; H04L 9/00; H04L 9/28; G09G 5/39; H04N 1/32272; H04N 1/44; H04N 1/4486; H04N 5/913; H04K 1/00; G11B 20/00086; G11B 20/000471; G11B 20/000478

See application file for complete search history.

(56) References Cited

U.S. PATENT DOCUMENTS 7,455,232 B2 *  11/2008  Epshteyn ........... G06K 7/10722
                                                        235/462.01
7,840,034 B2    11/2010  Takahashi et al.
(Continued)

FOREIGN PATENT DOCUMENTS

WO    2013096258 A1    6/2013

OTHER PUBLICATIONS

"Mobility and Security," McAfee, 8 pages (2011).
(Continued)

*Primary Examiner* — Jayesh M Jhaveri (57) ABSTRACT

Technologies are generally described for implementing an information rendering scheme. In some examples, a method performed under control of an end device may include obtaining a decryption key; decrypting encrypted information based on the obtained decryption key; and rendering the decrypted information stored in a video random access memory (VRAM) that is operatively connected to a graphic processing unit (GPU) of the end device.

14 Claims, 5 Drawing Sheets

(51) Int. Cl.
*G06F 21/84* (2013.01)
*H04N 1/44* (2006.01)
*G11B 20/00* (2006.01)

(56) References Cited

U.S. PATENT DOCUMENTS

| | | | |
|---|---|---|---|
| 7,890,747 B2 | 2/2011 | Dempski et al. | |
| 7,936,905 B2 | 5/2011 | Takahashi et al. | |
| 8,370,646 B2 | 2/2013 | Nason et al. | |
| 8,526,798 B2 * | 9/2013 | Hesselink | H04N 5/765 386/200 |
| 2003/0140241 A1 * | 7/2003 | England | G06F 21/64 713/194 |
| 2004/0109563 A1 * | 6/2004 | Evans | G11B 20/00086 380/227 |
| 2004/0156613 A1 * | 8/2004 | Hempel | H04N 5/913 386/328 |
| 2005/0160285 A1 * | 7/2005 | Evans | G06F 21/84 713/194 |
| 2006/0083404 A1 * | 4/2006 | Shimosato | H04N 1/00363 382/100 |
| 2007/0124821 A1 | 5/2007 | Saito | |
| 2007/0234229 A1 | 10/2007 | Ohtsuka et al. | |
| 2008/0025508 A1 * | 1/2008 | Lee | H04N 5/913 380/201 |
| 2010/0053180 A1 | 3/2010 | Ostiguy et al. | |
| 2010/0110085 A1 * | 5/2010 | Samuel | G06F 3/14 345/519 |
| 2011/0161675 A1 | 6/2011 | Diard | |
| 2011/0246768 A1 * | 10/2011 | Mahmud | H04L 9/0662 713/167 |
| 2013/0085941 A1 | 4/2013 | Rosenblatt et al. | |
| 2013/0321554 A1 * | 12/2013 | Martinsen | H04N 7/147 348/14.02 |

OTHER PUBLICATIONS

"The Impact of Mobile Devices on Information Security: A Survey of IT Professionals," Dimensional Research, Check Point Software Technologies Ltd., pp. 1-12 (Jun. 2013).

"Why Should Mobile Developers Care About the Hardware?," Qualcomm Incorporated, pp. 1-12 (Apr. 2010).

Akbar, M.A., et al., "The Droid Knight: a silent guardian for the Android kernel, hunting for rogue smartphone malware applications," accessed at https://web.archive.org/web/20130630163011/http://www.virusbtn.com/conference/vb2013/abstracts/Akbar-etal.xml, accessed on Jul. 9, 2015, p. 1.

International Search Report and Written Opinion for International Application No. PCT/US13/78254 dated May 30, 2014.

Lagendijk, R.L., et al., "Encrypted signal processing for privacy protection: Conveying the utility of homomorphic encryption and multiparty computation," IEEE Signal Processing Magazine, vol. 30, Issue 1, pp. 82-105 (Jan. 2013).

Shibata, Y., et al., "Mechanism-based PKI—A real-time key generation from fingerprints," Proceedings of the 2006 International Conference on Security & Management, pp. 468-474 (Jun. 2006).

Willis, D.A., "Bring Your Own Device: New Opportunities, New Challenges," Gartner, pp. 1-9 (Aug. 16, 2012).

Extended European Search Report for European Application No. 13900751.2 dated Jul. 10, 2017, pp. 10.

* cited by examiner

INFORMATION RENDERING SCHEME

CROSS-REFERENCE TO RELATED APPLICATION

This Application is the U.S. National Stage filing under 35 U.S.C. § 371 of International Application No. PCT/US2013/078254, filed on Dec. 30, 2013. The disclosure of the International Application No. PCT/US2013/078254, is hereby incorporated herein by reference in its entirety.

BACKGROUND

A graphic processing unit (GPU) is a specialized electronic circuit designed to rapidly manipulate and alter memory in order to accelerate the building of images in a frame buffer intended for output to a display. The GPU may be used in embedded systems, mobile phones, personal computers, workstations, game servers, game consoles, and the like. Rendering and encoding processes may be carried out on servers and/or end devices equipped with a GPU, such as mobile phones, personal computers, or game consoles.

SUMMARY

In an example, a method performed under control of an end device may include obtaining a decryption key; decrypting encrypted information based on the obtained decryption key; and rendering the decrypted information stored in a video random access memory (VRAM) that is operatively connected to a graphic processing unit (GPU) of the end device.

In another example, an end device may include a decryption key obtaining unit configured to obtain a decryption key; an encrypted information recognition unit configured to recognize encrypted information; a decryption unit configured to decrypt the recognized encrypted information using the decryption key; and a rasterizing unit configured to rasterize the decrypted information into a bitmap image.

In yet another example, a computer-readable storage medium may store thereon computer-executable instructions that, in response to execution, may cause an end device to perform operations, including recognizing encrypted information stored in a video random access memory (VRAM) that is operatively connected to a graphic processing unit (GPU) of the end device; obtaining decryption key; decrypting the recognized encrypted information based on the decryption key information; and rendering the decrypted information.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an information rendering scheme. Technologies are generally described for a scheme for rendering secured information without allowing any software running on a central processing unit (CPU) to access the secured information.

In some examples, an end device may be configured to display a bitmap image including a barcode image that includes encrypted information. The displayed bitmap image may be stored in a video random access memory (VRAM) that is operatively connected to a graphic processing unit (GPU) of the end device, automatically when the bitmap image is displayed. Further, the end device may be configured to obtain a decryption key from outside of the end device by using a near field communication (NFC) reader or an integrated circuit (IC) chip reader. Further, the end device may be configured to extract the encrypted information from the bitmap image stored in the VRAM, and to decrypt the encrypted information by using the obtained decryption key. The end device may be further configured to rasterize the decrypted information into a bitmap image that is readable by a user of the end device. Further, the end device may be configured to store the rasterized bitmap image in the VRAM, and to render the rasterized bitmap image to a display that is communicatively coupled to the end device for displaying the rasterized bitmap image.

Various kinds of spyware programs or hacking programs may be running on a central processing unit (CPU) as a kernel module or a kernel programs that may be configured to intercept or hack data or information stored in a memory accessible by the CPU. However, since the bitmap image including the encrypted information is stored in the VRAM which is connected to the GPU and is not accessible by the CPU, and the decrypted information is also stored in the VRAM, it is not possible for the spyware programs or hacking programs running on the CPU to intercept the information.

Figure 1:
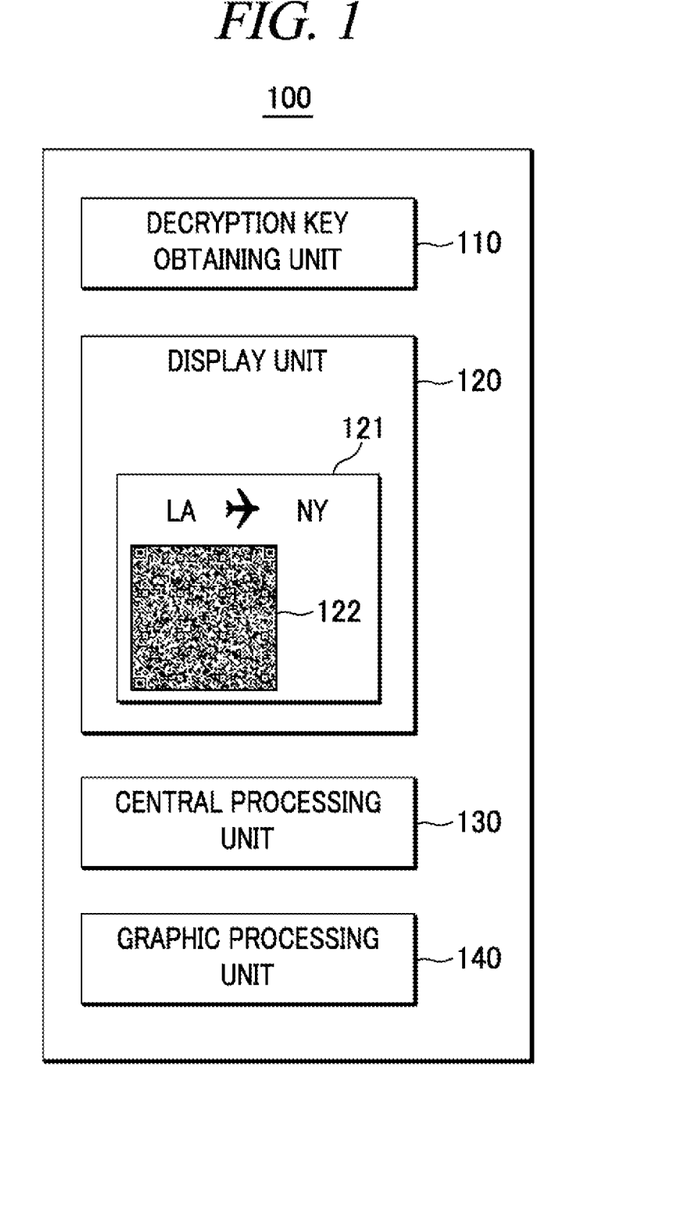
FIG. 1 shows a schematic block diagram illustrating an example architecture for an end device, arranged in accordance with at least some embodiments described herein.

FIG. 1 shows a schematic block diagram illustrating an example architecture for an end device 100, arranged in accordance with at least some embodiments described herein. As depicted in FIG. 1, end device 100 may include a decryption key obtaining unit 110, a display unit 120, a central processing unit 130 and a graphic processing unit 140. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of decryption key obtaining unit 110, display unit 120, central processing unit 130 and graphic processing unit 140 may be included in an instance of an application hosted on end device 100.

End device 100 may refer to a notebook computer; a personal computer; a smart phone; a tablet computer; a phablet device; and/or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminals.

Decryption key obtaining unit 110 may be configured to obtain a decryption key. For example, but not as a limitation, the decryption key may be a bit sequence having a predetermined digit number. Decryption key obtaining unit 110 may include at least one of a near field communication (NFC) reader or an integrated circuit (IC) chip reader that may be connected to graphic processing unit 140. Decryption key obtaining unit 110 may be configured to obtain the decryption key from an NFC chip or an IC chip that stores the decryption key by using the NFC reader or the IC chip reader.

Further, in some embodiments, the decryption key may be updated at a predetermined time interval. For example, but not as a limitation, an owner or entity who controls end device 100 may transmit and/or write a new decryption key everyday to the NFC chip or the IC chip. Decryption key obtaining unit 110 may be configured to then obtain the updated decryption key from the NFC chip or the IC chip.

For another example, decryption key obtaining unit 110 may be configured to obtain the decryption key from biometric information of a user of end device 100. For example, but not as a limitation, decryption key obtaining unit 110 may be configured to recognize a fingerprint of the user or to capture an image of an iris of the user. Further, decryption key obtaining unit 110 may be configured to obtain the decryption key based at least in part on the recognized fingerprint or the captured image of the iris by using any well-known encrypting-decrypting method using biometric information.

Display unit 120 may be configured to render graphical data that may include encrypted information. The graphical data may be transmitted from central processing unit 130. Non-limiting examples of a type of the graphical data may include scalable vector graphics (SVG), hypertext markup language (HTML) Tables, HTML5 Canvas, and Adobe Flash, etc. Further, display unit 120 may be configured to render and/or convert the graphical data into a bitmap image. In some embodiments, display unit 120 may be configured to display a bitmap image 121 that includes an image 122 including encrypted information. For example, but not as a limitation, image 122 that is associated with the encrypted information may include a two-dimensional barcode image or a quick response code image. Further, the encrypted information may include an image data, a text data or a byte sequence. For example, as depicted in FIG. 1, bitmap image 121 may include quick response code image 122 that includes encrypted flight information regarding a flight from Los Angeles to New York.

Further, display unit 120 may be configured to display a rasterized bitmap image to which decrypted information is rasterized. The decrypted information may refer to information to which the encrypted information is decrypted. For example, but not as a limitation, the rasterized bitmap image may include multiple small dots to indicate an image or a text.

In some other embodiments, display unit 120 may be configured to transmit bitmap image 121 and/or the rasterized bitmap image to which the decrypted information is rasterized to a display that is communicatively coupled to end device 100. The display may be configured to then display transmitted bitmap image 121 and/or the rasterized bitmap image.

Central processing unit 130 may be configured to send, to graphic processing unit 140, bitmap image 121 including image 122 that is associated with the encrypted information and an instruction to display bitmap image 121. Central processing unit 130 may be configured to render graphical data that may be converted to bitmap image 121 including the encrypted information to graphic processing unit 140. Non-limiting examples of a type of the graphical data may include scalable vector graphics (SVG), hypertext markup language (HTML) Tables, HTML5 Canvas, and Adobe Flash, etc.

Graphic processing unit 140 may be configured to control display unit 120 to display bitmap image 121 when graphic processing unit 140 receives, from central processing unit 130, bitmap image 121 and the instruction to display bitmap image 121. Further, graphic processing unit 140 may be configured to store bitmap image 121 in a video random access memory (VRAM) that is operatively connected to graphic processing unit 140.

Graphic processing unit 140 may be configured to recognize the encrypted information from bitmap image 121 stored in the VRAM. By way of example, but not as a limitation, graphic processing unit 140 may be configured to recognize image 122 including a two-dimensional barcode image or a quick response code image.

Further, graphic processing unit 140 may be configured to validate the decryption key that is obtained by decryption key obtaining unit 110. For example, but not as a limitation, graphic processing unit 140 may be configured to compare the decryption key that is obtained by decryption key obtaining unit 110 and a reference decryption key that is stored and register previously in a memory. Further, graphic processing unit 140 may be configured to determine the decryption key to be valid, if the decryption key is determined to be identical to the reference decryption key.

Further, graphic processing unit 140 may be configured to decrypt the recognized encrypted information based at least in part on the validated decryption key. For example, but not limitation, graphic processing unit 140 may be configured to restore an encrypted byte sequence from image 122 including a two-dimensional barcode image or a quick response code image. Further, graphic processing unit 140 may be configured to decrypt the restored encrypted byte sequence by using the validated decryption key. Graphic processing unit 140 may be configured to decrypt the restored encrypted byte sequence by using any well-known cryptographic algorithm.

Graphic processing unit 140 may be further configured to rasterize the decrypted information into a bitmap image that is readable by a user of end device 100. For example, but not as a limitation, graphic processing unit 140 may be configured to convert the decrypted byte sequence into a bitmap image by using multiple small dots. Further, graphic processing unit 140 may be configured to store the rasterized bitmap image in the VRAM.

Further, graphic processing unit 140 may be configured to render the decrypted information that is rasterized and stored in the VRAM. In some embodiments, graphic processing unit 140 may be configured to render the rasterized bitmap image to display unit 120. Then, display unit 120 may be configured to display the rasterized bitmap image, so the decrypted information, to which the encrypted information that was included in image 122 is decrypted, may be presented to a user of end device 100.

Figure 2:
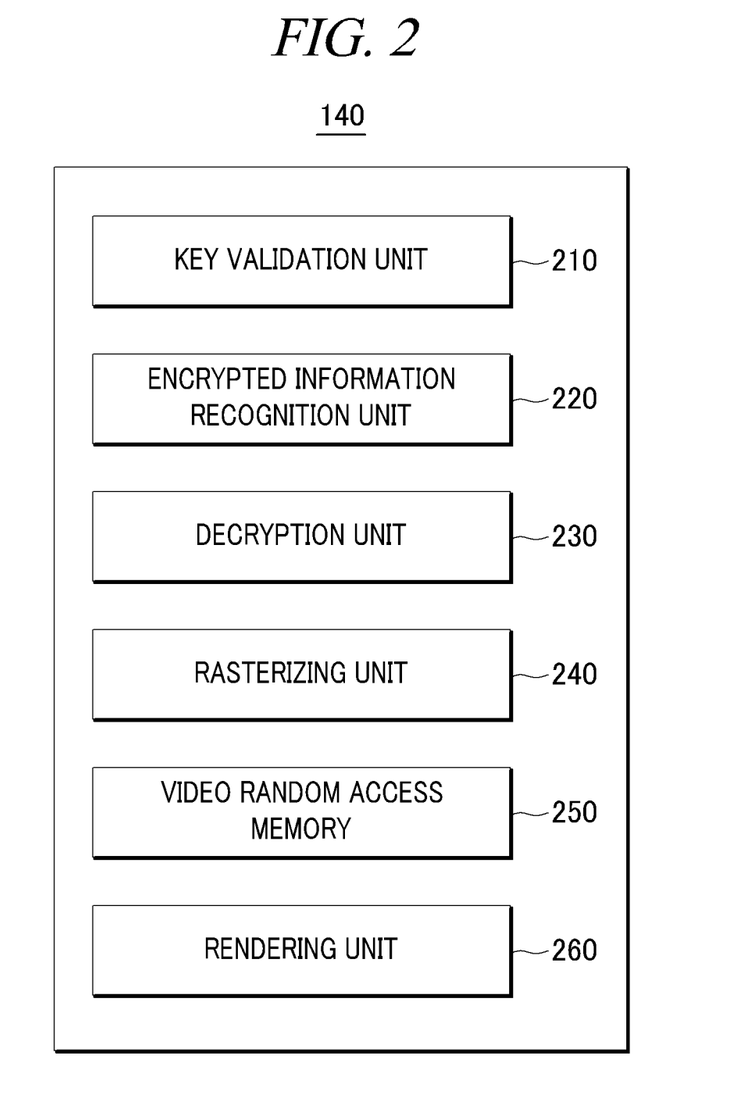
FIG. 2 shows a schematic block diagram illustrating an example architecture for a graphic processing unit of an end device, arranged in accordance with at least some embodiments described herein.

FIG. 2 shows a schematic block diagram illustrating an example architecture for a graphic processing unit 140 of an end device 100, arranged in accordance with at least some embodiments described herein. As depicted in FIG. 2, graphic processing unit 140 may include a key validation unit 210, an encrypted information recognition unit 220, a decryption unit 230, a rasterizing unit 240, a video random access memory (VRAM) 250 and a rendering unit 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of key validation unit 210, encrypted information recognition unit 220, decryption unit 230, rasterizing unit 240, video random access memory 250 and rendering unit 260 may be included in an instance of an application hosted on end device 100.

Key validation unit 210 may be configured to validate a decryption key that is obtained by decryption key obtaining unit 110 by using a well-known validation method using a public-key or a secret key. Further, key validation unit 210 may be configured to update the decryption key at a predetermined time interval, and to validate the decryption key based on the updated decryption key.

Encrypted information recognition unit 220 may be configured to recognize encrypted information that is stored in video random access memory 250. For example, but not as a limitation, encrypted information recognition unit 220 may be configured to detect a two-dimensional barcode image that includes the encrypted information from a bitmap image stored in video random access memory 250. For example, the encrypted information may include image data, text data, a byte sequence and so on.

Decryption unit 230 may be configured to decrypt the encrypted information that is recognized by encrypted information recognition unit 220 by using the decryption key that is validated by key validation unit 210. For example, but not as a limitation, decryption unit 230 may be configured to decrypt the encrypted information by using any well-known cryptographic algorithm using a public-key or a shared key. In some embodiments, decryption unit 230 may be configured to restore the encrypted information (e.g., a byte sequence or a text data) from the two-dimensional barcode detected by encrypted information recognition unit 220. Further, decryption unit 230 may be configured to decrypt the restored encrypted information by using the validated decryption key.

Rasterizing unit 240 may be configured to rasterize the information that is decrypted by decryption unit 230 into a bitmap image that is readable by a user of end device 100. For example, rasterizing unit 240 may be configured to convert the decrypted information into a bitmap image by using multiple small dots depending on a type of the decrypted information (e.g., image data or text data).

Video random access memory 250 may be configured to store bitmap data regarding a bitmap image that includes the encrypted information. Video random access memory 250 may be configured to store the bitmap image that includes a two-dimensional barcode image or a quick response code image that is associated with the encrypted information, when display unit 120 displays the bitmap image.

Further, video random access memory 250 may be configured to store the rasterized bitmap image to which the decrypted information is rasterized by rasterizing unit 240.

Rendering unit 260 may be configured to render the decrypted information that is stored in video random access memory 250. For example, rendering unit 260 may be configured to render the rasterized bitmap image stored in video random access memory 250 to display unit 120 for displaying the bitmap image. Then, the decrypted information may be presented to a user of end device 100.

Figure 3:
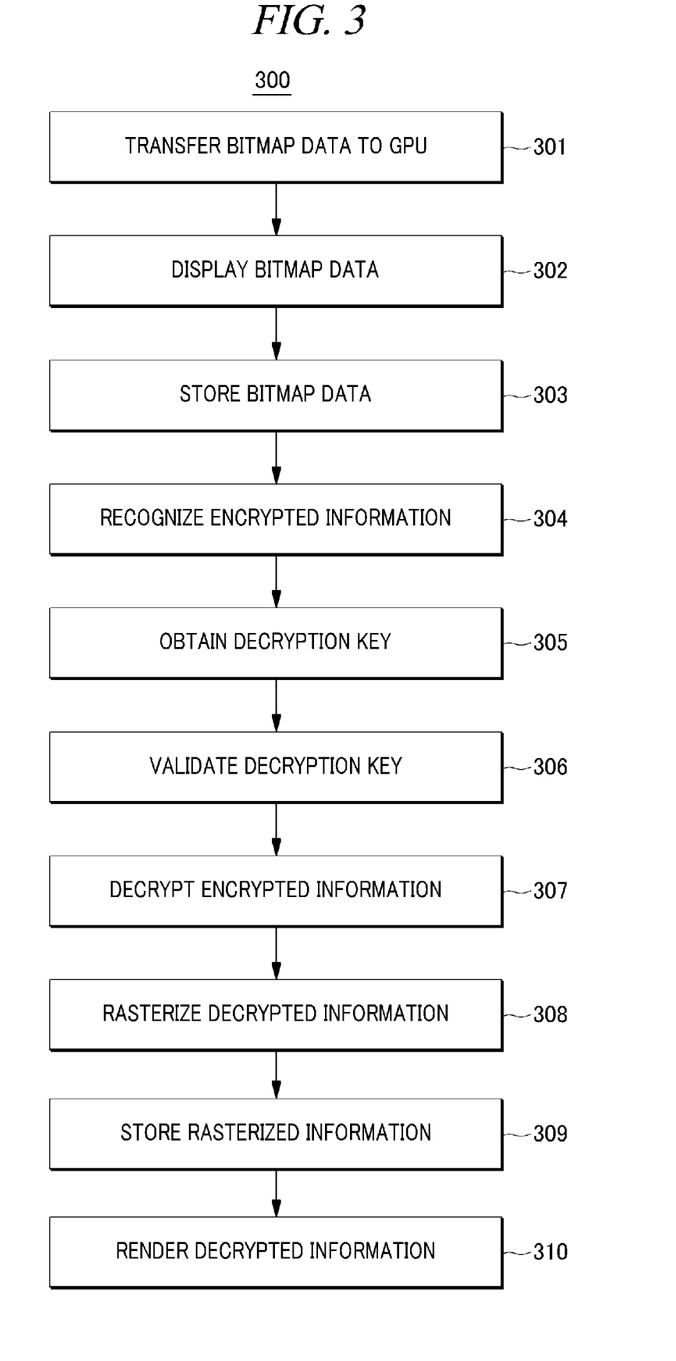
FIG. 3 schematically shows an example flow diagram of a process of an end device for implementing an information rendering scheme, arranged in accordance with at least some embodiments described herein.

FIG. 3 schematically shows an example flow diagram of a process 300 of an end device 100 for implementing an information rendering scheme, arranged in accordance with at least some embodiments described herein. The process in FIG. 3 may be implemented by end device 100 including at least one decryption key obtaining unit 110, display unit 120, central processing unit 130 and graphic processing unit 140, as illustrated in FIG. 1. An example process may include one or more operations, actions, or functions as illustrated by one or more blocks 301, 302, 303, 304, 305, 306, 307, 308, 309 and/or 310. Although illustrated as discrete blocks, various blocks may be divided into additional blocks, combined into fewer blocks, or eliminated, depending on the desired implementation. Processing may begin at block 301.

At block 301 (Transfer Bitmap Data to GPU), central processing unit 130 may transfer bitmap data to graphic processing unit 140. For example, but not as a limitation, the bitmap data may include a bitmap image that includes a two dimensional barcode image or a quick response code image, and encrypted information may be included in the two dimensional barcode image or quick response code image. For example, but not as a limitation, the encrypted information may include image data, text data, a byte sequence and so on. Processing may proceed from block 301 to block 302.

At block 302 (Display Bitmap Data), display unit 120 may display the bitmap data received at block 301. Graphic processing unit 140 may control display unit 120 to display the bitmap data. For example, but not as a limitation, display unit 120 may display the bitmap image including the two dimensional barcode image or quick response code image that is associated with the encrypted information on a display that is communicatively coupled to end device 100. Processing may proceed from block 302 to block 303.

At block 303 (Store Bitmap Data), graphic processing unit 140 may store the bitmap data in a video random access memory (VRAM) that is operatively connected to graphic processing unit 140. Processing may proceed from block 303 to block 304.

At block 304 (Recognize Encrypted Information), graphic processing unit 140 may recognize the encrypted information that is stored in the video random access memory. For example, but not as a limitation, graphic processing unit 140 may detect the two-dimensional barcode image or quick response code image that includes the encrypted information from the bitmap image stored in the video random access memory. Processing may proceed from block 304 to block 305.

At block 305 (Obtain Decryption Key), decryption key obtaining unit 110 may obtain a decryption key. For example, but not as a limitation, the decryption key may be a bit sequence having a predetermined digit number. Decryption key obtaining unit 110 may obtain the decryption key by using at least one of a near field communication (NFC) reader or an integrated circuit (IC) chip reader that may be connected to graphic processing unit 140. For another example, decryption key obtaining unit 110 may obtain the decryption key from biometric information of a user of end device 100. For example, but not as a limitation, decryption key obtaining unit 110 may recognize a fingerprint of the user or capture an image of an iris of the user. Further, decryption key obtaining unit 110 may obtain the decryption key based at least in part on the recognized fingerprint or the captured image of the iris by using any well-known encrypting-decrypting method using biometric information. Processing may proceed from block 305 to block 306.

At block 306 (Validate Decryption Key), graphic processing unit 140 may validate the decryption key that is obtained at block 305 by using a well-known validation method using a public-key or a secret key. Alternatively, graphic processing unit 140 may validate the decryption key by comparing the obtained decryption key and a reference decryption key that is stored and registered previously in a memory. Graphic processing unit 140 may determine the decryption key to be valid, if the obtained decryption key is identical to the reference decryption key. Processing may proceed from block 306 to block 307.

At block 307 (Decrypt Encrypted Information), graphic processing unit 140 may decrypt the encrypted information recognized at block 304 based at least in part on the decryption key validated block 306. For example, graphic processing unit 140 may restore an encrypted byte sequence or text data from the two-dimensional barcode detected at block 304. Further, graphic processing unit 140 may decrypt the encrypted byte sequence or text data by using the validated decryption key. Processing may proceed from block 307 to block 308.

At block 308 (Rasterize Decrypted Information), graphic processing unit 140 may rasterize the information decrypted at block 307 into a bitmap image that is readable by a user of end device 100. For example, but not as a limitation, graphic processing unit 140 may convert the decrypted information into a bitmap image by using multiple small dots depending on a type of the decrypted information (e.g., image data or text data). Processing may proceed from block 308 to block 309.

At block 309 (Store Rasterized Information), graphic processing unit 140 may store the rasterized information in the video random access memory. For example, but not as a limitation, graphic processing unit 140 may store, in the video random access memory, the rasterized bitmap image to which the decrypted information is rasterized. Processing may proceed from block 309 to block 310.

At block 310 (Render Decrypted Information), graphic processing unit 140 may render the decrypted information that is rasterized and stored in the video random access memory. In some embodiments, graphic processing unit 140 may render the rasterized bitmap image to display unit 120. Then, display unit 120 may display the rasterized bitmap image that includes the decrypted information, so the decrypted information may be presented to the user of end device 100.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 4:
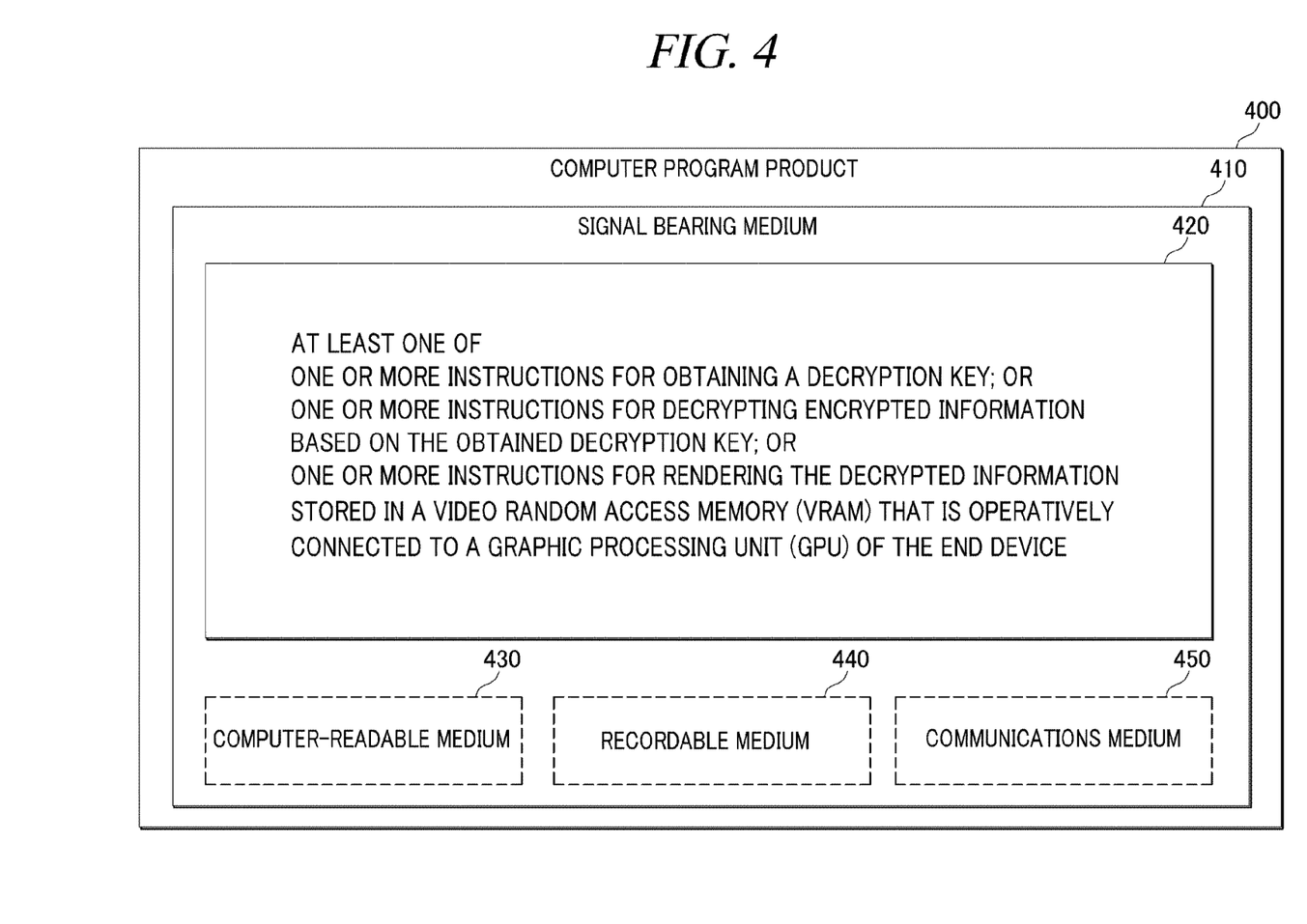
FIG. 4 illustrates computer program products that may be utilized to implement an information rendering scheme, arranged in accordance with at least some embodiments described herein.

FIG. 4 illustrates computer program products that may be utilized to implement an information rendering scheme, arranged in accordance with at least some embodiments described herein. Computer program product 400 may include a signal bearing medium 410. Signal bearing medium 410 may include one or more instructions 420 that, when executed by, for example, a processor, may provide the functionality described above with respect to FIGS. 1-3. By way of example, instructions 420 may include: one or more instructions for obtaining a decryption key; one or more instructions for decrypting encrypted information based on the obtained decryption key; one or more instructions for rendering the decrypted information stored in a video random access memory (VRAM) that is operatively connected to a graphic processing unit (GPU) of the end device. Thus, for example, referring to FIG. 1, end device 100 may undertake one or more of the blocks shown in FIG. 3 in response to instructions 420.

In some implementations, signal bearing medium 410 may encompass a computer-readable medium 430, such as, but not limited to, a hard disk drive (HDD), a compact disc (CD), a digital versatile disc (DVD), a digital tape, memory, etc. In some implementations, signal bearing medium 410 may encompass a recordable medium 440, such as, but not limited to, memory, read/write (R/W) CDs, R/W DVDs, etc. In some implementations, signal bearing medium 410 may encompass a communications medium 450, such as, but not limited to, a digital and/or an analog communication medium (e.g., a fiber optic cable, a waveguide, a wired communication link, a wireless communication link, etc.). Thus, for example, computer program product 400 may be conveyed to one or more modules of end device 100 by an RF signal bearing medium 410, where the signal bearing medium 410 is conveyed by a wireless communications medium 450 (e.g., a wireless communications medium conforming with the IEEE 802.11 standard).

Figure 5:
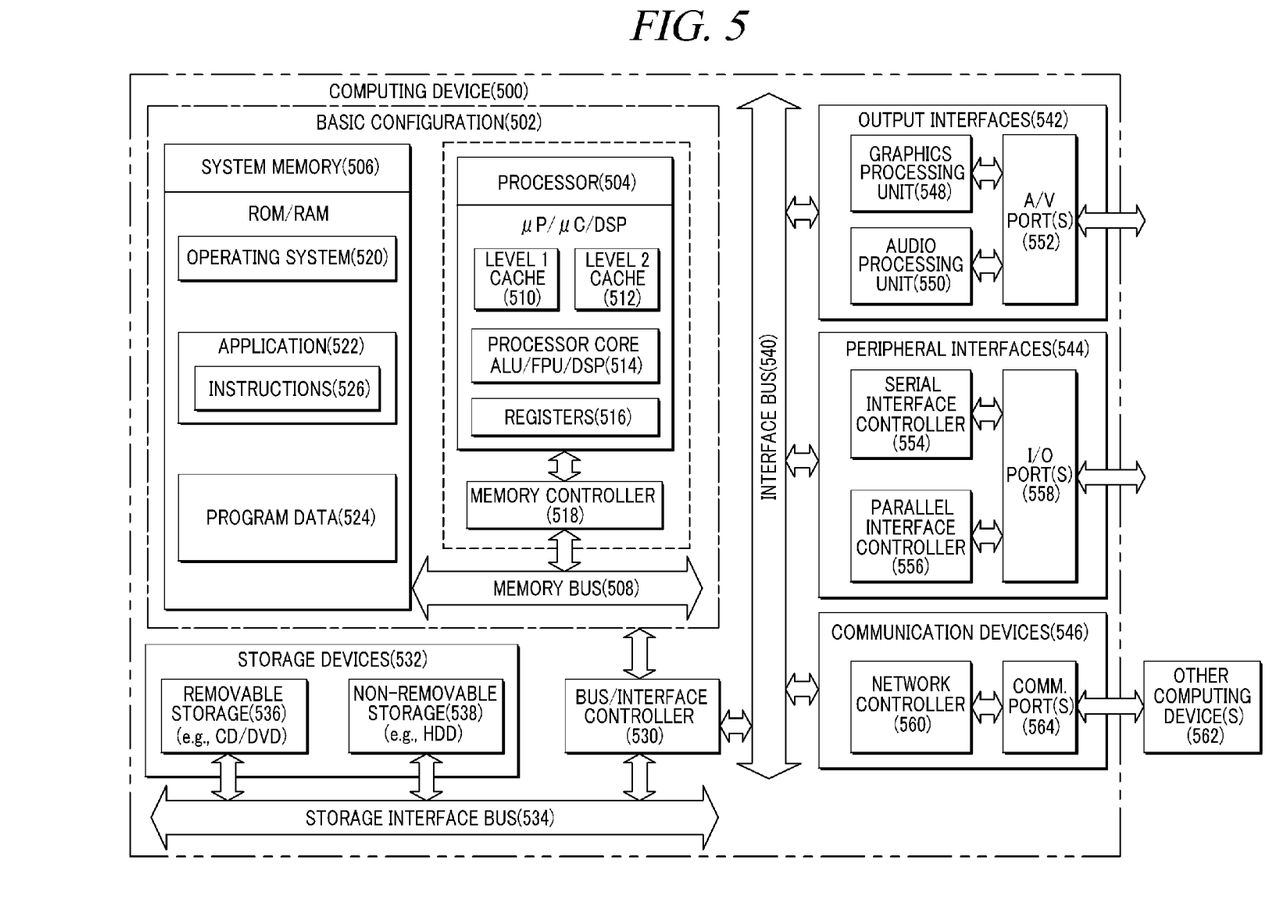
FIG. 5 is a block diagram illustrating an example computing device that may be utilized to implement an information rendering scheme, arranged in accordance with at least some embodiments described herein.

FIG. 5 is a block diagram illustrating an example computing device that may be utilized to implement an information rendering scheme, arranged in accordance with at least some embodiments described herein. In these examples, elements of computing device 500 may be arranged or configured for a device. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations, memory controller 518 may be an internal part of processor 504.

Depending on the desired configuration, system memory 506 may be of any type including but not limited to volatile memory (such as RAM), nonvolatile memory (such as ROM, flash memory, etc.) or any combination thereof. System memory 506 may include an operating system 520, an application 522, and program data 524. Application 522 may include instructions 526 that may be arranged to perform the functions as described herein including the actions described with respect to end device architecture as shown in FIG. 1 or including the actions described with respect to the flow charts shown in FIG. 3. In some examples, application 522 may be arranged to operate with program data 524 on an operating system 520 such that the schemes for providing game characters as described herein may be provided.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of an end device, the method comprising:
   recognizing encrypted information from a video random access memory (VRAM);
   displaying, by a graphic processing unit (GPU) of the end device, a two-dimensional barcode image that includes the recognized encrypted information;
   storing bitmap data regarding the two-dimensional barcode image in the VRAM, wherein the bitmap data is inaccessible by a central processing unit (CPU) of the end device;
   obtaining a decryption key;
   decrypting the recognized encrypted information based on the obtained decryption key;
   rasterizing the decrypted information into a bitmap image; and
   rendering the decrypted information stored in the VRAM, which is operatively connected to the GPU of the end device.

2. The method of claim 1, further comprising:
   displaying the bitmap image.

3. The method of claim 1, wherein the obtaining is executed by at least one of a near field communication (NFC) reader or an integrated circuit (IC) chip reader that is connected to the GPU of the end device.

4. The method of claim 3, further comprising:
   updating the obtained decryption key at a particular time interval.

5. The method of claim 1, wherein the obtaining includes obtaining the decryption key from biometric information of a user of the end device.

6. The method of claim 1, further comprising:
   validating the obtained decryption key,
   wherein the recognized encrypted information is decrypted using the validated decryption key.

7. An end device, comprising:
   a processor; and
   a memory operatively coupled to the processor and having instructions stored thereon, that in response to execution by the processor, cause the processor to perform or control performance of operations that include:
      obtain a decryption key;
      recognize encrypted information stored on a video random access memory (VRAM);

display, by a graphic processing unit (GPU) of the end device, a two-dimensional barcode image that includes the recognized encrypted information;
store bitmap data regarding the two-dimensional barcode image in the VRAM, wherein the bitmap data is inaccessible by the processor of the end device;
decrypt the recognized encrypted information using the obtained decryption key;
rasterize the decrypted information into a bitmap image;
store the rasterized bitmap image on the VRAM; and
render the decrypted information stored in the VRAM, which is operatively connected to the GPU of the end device.

8. The end device of claim 7, wherein the processor is further configured to perform or control performance of operations that include:
validate the obtained decryption key; and
decrypt the recognized encrypted information using the validated decryption key.

9. The end device of claim 7, wherein the processor is operatively connected to the GPU of the end device.

10. The end device of claim 7, wherein the processor is configured to control at least one of a near field communication (NFC) reader or an integrated circuit (IC) chip reader that is configured to obtain the decryption key, and is connected to the GPU of the end device.

11. The end device of claim 10, wherein the obtained decryption key is updated at a particular time interval.

12. The end device of claim 7, wherein the processor is configured to perform or control performance of operations that include:
obtain the decryption key from biometric information of a user of the end device.

13. A non-transitory computer-readable storage medium having stored thereon computer-executable instructions that, in response to execution, cause an end device to perform or control performance of operations, comprising:
recognize encrypted information stored in a video random access memory (VRAM) that is operatively connected to a graphic processing unit (GPU) of the end device;
display, by the GPU, a two-dimensional barcode image that includes the recognized encrypted information;
store bitmap data regarding the two-dimensional barcode image in the VRAM, wherein the bitmap data is inaccessible by a central processing unit (CPU) of the end device;
obtain decryption key;
decrypt the recognized encrypted information based on the obtained decryption key information;
rasterize the decrypted information into a bitmap image;
store the rasterized bitmap image on the VRAM; and
render the decrypted information stored in the VRAM.

14. An end device, comprising:
a graphical processing unit (GPU);
a central processing unit (CPU) coupled to the GPU and configured to transfer a two-dimensional barcode image that includes encrypted information to the GPU;
a video random access memory (VRAM) coupled to the GPU,
wherein the VRAM is configured to store bitmap data that corresponds to the two-dimensional barcode image,
wherein the bitmap data is inaccessible to the CPU of the end device,
wherein the GPU is configured to:
recognize the encrypted information stored on the VRAM;
decrypt the recognized encrypted information using a decryption key; and
rasterize the decrypted information into a bitmap image; and
wherein the VRAM is configured to store the rasterized bitmap image; and
a display coupled to the GPU and the VRAM, and configured to render the decrypted information stored in the VRAM.

* * * * *